United States Patent
Millar et al.

(10) Patent No.: US 9,366,858 B2
(45) Date of Patent: Jun. 14, 2016

(54) OPTICALLY-CONTROLLED MICROMIRROR DEVICE

(71) Applicant: Empire Technology Development LLC, Wilmington (DE)

(72) Inventors: Benjamin William Millar, Rosebery (AU); George Charles Peppou, Hornsby Heights (AU); Benjamin Watson Barnes, Thornleigh (AU)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 0 days.

(21) Appl. No.: 14/424,414

(22) PCT Filed: May 5, 2014

(86) PCT No.: PCT/US2014/036854
§ 371 (c)(1),
(2) Date: Feb. 26, 2015

(87) PCT Pub. No.: WO2015/171115
PCT Pub. Date: Nov. 12, 2015

(65) Prior Publication Data
US 2016/0077330 A1    Mar. 17, 2016

(51) Int. Cl.
*G02B 26/08* (2006.01)
*G02B 27/14* (2006.01)
*H04Q 11/00* (2006.01)

(52) U.S. Cl.
CPC .......... *G02B 26/0833* (2013.01); *G02B 27/141* (2013.01); *H04Q 11/0005* (2013.01); *H04Q 2011/003* (2013.01); *H04Q 2011/0009* (2013.01)

(58) Field of Classification Search
CPC ............. G02B 26/0833; G02B 27/141; H04Q 11/0005; H04Q 2011/003; H04Q 2011/0009
USPC .......................................................... 398/48
See application file for complete search history.

(56) References Cited

U.S. PATENT DOCUMENTS

| | | | |
|---|---|---|---|
| 5,321,774 A | 6/1994 | Barnard et al. | |
| 5,982,516 A | 11/1999 | Murphy et al. | |
| 6,204,946 B1 | 3/2001 | Aksyuk et al. | |
| 6,310,339 B1 | 10/2001 | Hsu et al. | |
| 6,385,363 B1 | 5/2002 | Rajic et al. | |
| 6,396,976 B1 | 5/2002 | Little et al. | |
| 6,445,488 B1 | 9/2002 | Lee | |
| 6,567,574 B1 * | 5/2003 | Ma .................... | H04Q 11/0005 385/16 |

(Continued)

OTHER PUBLICATIONS

"Dichroic Mirrors/Beamsplitters," accessed at http://www.thorlabs.hk/newgrouppage9.cfm?objectgroup_id=3313, accessed on Dec. 26, 2014, pp. 1-7.

(Continued)

*Primary Examiner* — Dalzid Singh
(74) *Attorney, Agent, or Firm* — Turk IP Law, LLC

(57) ABSTRACT

Technologies are generally described for using different wavelengths and/or using different frequencies of light to encode each of information data and control data in a beam of light and to use the encoded control data to route the encoded information data through a network. Routing may be effected using optical switches configured with transmissive and reflective properties, which may allow transmission of certain encoded control data and may allow reflection of certain information data, depending upon the routing for the travel of the light through the network.

19 Claims, 6 Drawing Sheets

(56) References Cited

U.S. PATENT DOCUMENTS

| | | | |
|---|---|---|---|
| 6,658,178 | B2 | 12/2003 | Kasuga et al. |
| 6,929,864 | B2 | 8/2005 | Fleming et al. |
| 7,149,427 | B1 | 12/2006 | Dewa et al. |
| 7,532,786 | B2 | 5/2009 | Poovey |
| 8,022,379 | B2 | 9/2011 | Davis et al. |
| 8,180,186 | B2 | 5/2012 | Poovey |
| 2002/0095618 | A1 | 7/2002 | Orcutt et al. |
| 2004/0091202 | A1* | 5/2004 | Ji .................. G02B 6/358 385/18 |
| 2008/0050065 | A1* | 2/2008 | Sakai .............. G02B 6/356 385/18 |
| 2015/0139585 | A1* | 5/2015 | Graves ............ G02B 6/3518 385/18 |

OTHER PUBLICATIONS

"How DLP Technology Works," accessed at http://web.archive.org/web/20140326142349/http://www.dlp.com/technology/how-dlp-works/default.aspx, accessed on Dec. 26, 2014, pp. 1-2.

Aksyuk, V.A., et al., "Beam-Steering Micromirrors for Large Optical Cross-Connects," Journal of lightwave technology, vol. 21, No. 3, pp. 634-642 (Mar. 2003).

Chang, C.M., et al., "A Comb-Drive Actuator Driven by Capacitively-Coupled Power," Sensors 2012, vol. 12, pp. 10881-10889 (2012).

International search report and written for PCT application No. PCT/US2014/036854 mailed on Aug. 28, 2014.

Koshiba, M., "Wavelength Division Multiplexing and Demultiplexing With Photonic Crystal Waveguide Couplers," Journal of lightwave technology, vol. 19, No. 12, pp. 1970-1975 (Dec. 2001).

MacDonald, R.I., and Hara, E., "Switching with Photodiodes," IEEE Journal of Quantum Electronics, vol. 16, No. 3, pp. 289-295 (Mar. 1980).

Shie, J.,S., and Hwang, T.S.D., "Fabrication of narrow-band self-filtering GaAs photodetector by epitaxy," Review of Scientific Instruments, vol. 76, No. 11, pp. 113108-113108-4 (Nov. 2005).

Yamauchi, Y., et al., "A Light-in Light-out Micro Mirror Device," The 13th International Conference on Solid-state Sensors, Actuators and Microsystems, vol. 2, pp. 1175-1178 (Jun. 5-9, 2005).

* cited by examiner

OPTICALLY-CONTROLLED MICROMIRROR DEVICE

TECHNICAL FIELD

The technical field of the disclosure generally relates to optical devices for routing optical communications through a network.

CROSS-REFERENCE TO RELATED APPLICATION

This Application is the National Stage filing under 35 U.S.C. §371 of PCT Application Ser. No. PCT/US2014/036854 filed on May 5, 2014, by the same inventors, commonly assigned herewith. The PCT application is hereby incorporated by reference in its entirety.

BACKGROUND

Unless otherwise indicated herein, the materials described in the section are not prior art to the claims in the application and are not admitted to be prior art by inclusion in the section.

Advances in modern technology demand faster communication of information from many points. Optical communications are theoretically faster than radio transmission, but technology in optical devices may not have kept pace with the speeds possible with, for example, fiber optic cables.

Light may be reflected with micromirrors and may be redirected with computer-controlled switches that actuate the micromirrors for redirection. As such, while the light may be used to transmit the information, electric control circuits may be used for control of flow of the information contained in the light, using electrical signals transmitted to the electric control circuits.

SUMMARY

The following summary is illustrative and is not intended to be in any way limiting. In addition to the illustrative aspects, examples, and features described above, further aspects, examples, and features will become apparent by reference to the drawings and the following detailed description.

According to some examples, the present disclosure describes an example optical device. The example optical device may include a mirror, a detection layer, and an actuator element coupled to the mirror. The mirror may be configured to receive a first incident beam encoded with information data and control data at an angle of incidence. The mirror may also be configured to reflect the information data and transmit the control data. The detection layer may be configured to receive the control data transmitted by the mirror. The detection layer may also be configured to generate a first electrical signal in response to the control data. The actuator element may be configured to alter the angle of incidence of the mirror in response to the first electrical signal.

According to other examples, the present disclosure describes an example optical system. The example optical system may include a target device and an optical device. The example optical device may be configured to receive incident optical information encoded with information data and control data. The incident optical information may be included in a first incident beam. The example optical device may also be configured to detect the control data in the incident optical information. The example optical device may additionally be configured to adjust the angle of reflection of the optical device in response to the detected control data, such that the reflection of the incident optical information may be directed to the target device. The reflection of the incident optical information may form a second incident beam for the target device.

According to further examples, the present disclosure describes an example method for controlling an optical switch. The example method may include arranging a first optical switch for communicating information data. The first optical switch for communicating information data may be arranged by reflecting at least a portion of an incident beam of light in a first wavelength range from a mirror. The first optical switch for communicating information data may also be arranged by transmitting through the mirror at least a portion of the incident beam of light having a second wavelength range. The first optical switch for communicating information data may also be arranged by controlling an orientation of the mirror of the optical switch using the transmitted portion of the incident beam of light, thereby altering an angle of reflection and a target destination of the reflected beam of light. The target destination may be a second optical switch.

BRIEF DESCRIPTION OF THE DRAWINGS

The foregoing and other features of the disclosure will become more fully apparent from the following description and appended claims, taken in conjunction with the accompanying drawings. Understanding that these drawings depict several examples in accordance with the disclosure and are not to be considered limiting of scope, the disclosure will be described with additional specificity and detail through use of the accompanying drawings, in which:

DETAILED DESCRIPTION

Figure 1A:
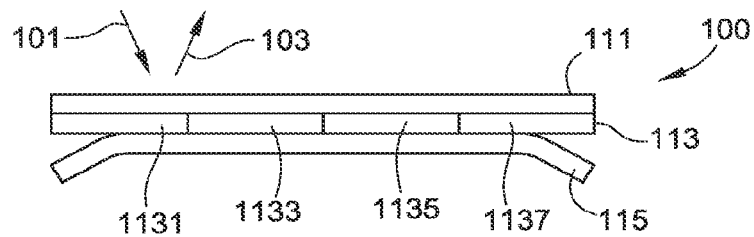
FIG. 1A depicts a first example of a micromirror optical device in a resting position.

In the following detailed description, reference is made to the accompanying drawings, which form a part hereof. In the drawings, similar symbols may identify similar components, unless context dictates otherwise. The illustrative examples described in the detailed description, drawings, and claims are not meant to be limiting. Other examples may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are explicitly contemplated herein.

The disclosure is generally drawn, inter alia, to methods, apparatus, systems, devices, and computer program products related to transmitting information via light.

In general, the methods, the apparatus, the systems, the devices, and the computer program products described herein may employ light of two or more wavelengths. A first wavelength of the light may be used for transmitting information data. A second wavelength of the light may be used for transmitting control data. The control data may control micromirror optical devices described here. The light of the first wavelength may be reflected from a surface of the micromirror optical device to a destination. In some examples, the light of the first wavelength may be reflected from the surface of the micromirror optical device along a path. Instead of reflecting the light of the second wavelength from the surface of the micromirror optical device, the light of the second wavelength may be transmitted by the micromirror optical device. Transmitted light from the micromirror optical device may penetrate the micromirror optical device. In addition, the transmitted light from the micromirror optical device may be detected by a detector, such as a photodiode. The detector may be part of an electrical circuit. The electrical circuit may detect the transmitted light. In some examples, the electrical circuit may provide a control signal to an actuator. The actuator may pivot and/or may tilt the micromirror optical device, which may allow the light of the first wavelength to be routed to a second destination and/or along a second path.

Light of the second wavelength may contain the control data and may also include the two or more wavelengths. The control data of the two or more wavelength may enable the control data to be used to control optical switches. In some examples, bands of the two or more wavelengths may enable the control data to be used to control the optical switches. The optical switches may be configured for transmissivity to the two or more wavelengths and/or to the bands of the two or more wavelengths of the control data.

Having provided an overview of the micromirror optical device of the disclosure, which may be self-contained and may be multi-filter, additional features may be provided by the disclosure.

Briefly stated, technologies are generally described for using different wavelengths and/or using different frequencies of light to encode each of information data and control data in a beam of light and to use the encoded control data to route the encoded information data through a network. Routing may be effected using optical switches configured with transmissive and reflective properties, which may allow transmission of certain encoded control data and may allow reflection of certain information data, depending upon the routing for the travel of the light through the network.

In some examples of the present disclosure, the micromirror optical device may be a self-contained signal interpreter and a signal router. A top layer of the micromirror optical device may include a wavelength-selective filter. The wavelength-selective filter may include, but is not limited to, a dichroic filter and a dielectric filter, among others. The top layer may be reflective of one of the first wavelength of the light that is incident on the top layer and a wavelength range of the light that is incident on the top layer. The light that is reflected may contain the information data that may be encoded in a manner known to those having ordinary skill in optical communication arts. The reflected light may be directed to a second optical device in series with the first optical device. In other examples, the reflected light may be directed to a terminus of the optical communication path, such as a computer with an optical data sensor configured to detect and decode optical data.

The path of the reflected light may be defined by orientation of a first micromirror optical device. The orientation of the first micromirror optical device may be adjusted in accordance with the control data encoded at one of the second wavelength and the wavelength range. The light at the second wavelength may be transmitted through the first micromirror optical device to the detector. The detector may be configured to detect the control data encoded at a detected wavelength. The detector may generate electrical signals for execution by control circuitry, for example, in a manner described below. The light that is reflected from the first micromirror optical device to the second micromirror optical device may then undergo a similar process of reflection by the second micromirror optical device in a path defined by the orientation of the second micromirror optical device. The second micromirror optical device may be adjusted in accordance with at least a certain other part of one of the second wavelength and the wavelength range that is transmitted through the micromirror optical device and processed as explained in connection with the first micromirror optical device above.

More specifically, the top layer of the first micromirror optical device may be selectively transmissive to the light of a selected wavelength in incident light. In some examples, the top layer of the micromirror optical device may transmit the light at the selected wavelength. Underneath the top layer of the micromirror optical device may be the detector. The detector may include a detection layer, another detector device, and/or an electronic circuit, among others. The detector may be sensitive to the light. In some examples, the detector may be a photodiode.

When the light strikes the photodiode, the electrical signal may be sent to the electric circuit, which may cause a movement in an underlying actuation layer to alter a position of the micromirror optical device. In some examples, the movement in the actuation layer may be a tilting of the micromirror optical device. When the micromirror optical device moves and/or tilts, the incident light that is reflected from the top layer changes. Before the tilting of the micromirror optical device, the reflected light may have been striking the second micromirror optical device in series. After alteration, the path of the reflected light may have changed to cause the reflected light to strike another micromirror optical device in an array of micromirror optical devices that may make up a network.

Particulars of the process may be explained with reference to descriptions below and the drawings accompanying the disclosure.

FIG. 1A illustrates a first example of a micromirror optical device in a resting position, arranged in accordance with at least some examples described herein.

As illustrated in the FIG. 1A, a cross-section construction of a micromirror optical device 100 is shown. The micromirror optical device 100 may include a top layer 111. The top layer 111 may comprise a dichroic filter. The dichroic filter may be reflective to a first beam of incident light 101, which may cause the first beam of incident light 101 to reflect from a surface as reflected light 103. The micromirror optical device 100 may include an under-layer and a bottom layer. The under-layer may be a detection layer 113. The bottom layer may be an actuation layer 115. When the first beam of incident light 101 of a certain wavelength is transmitted through the top layer 111, the first beam of incident light 101 may strike the detection layer 113 and may cause actuation of the actuation layer 115. Actuation may cause tilting of the micromirror optical device 100, so that the first beam of incident light 101 that is reflected is reflected at a different angle from that of the previous position of the micromirror optical device 100. The reflected light 103 may be sent on a different path to a different destination as a result of the actuation of the micromirror optical device 100.

In an example, the detection layer 113 may comprise a rigid dielectric substrate. The rigid dielectric substrate may include, but is not limited to, a plastic material and a composite material, among others. The rigid dielectric substrate may include electrical components that may be used to detect the first beam of incident light 101 of the certain wavelength that is transmitted through the top layer 111. The electrical components may include a conductor 1131, among others. The conductor 1131 may conduct electric power to the elements of an electrical circuit. The electrical circuit may include, for example, a resistor 1133, a metal-oxide-semiconductor field-effect transistor (MOSFET) 1135, and a photodiode 1137, among others.

Figure 1B:
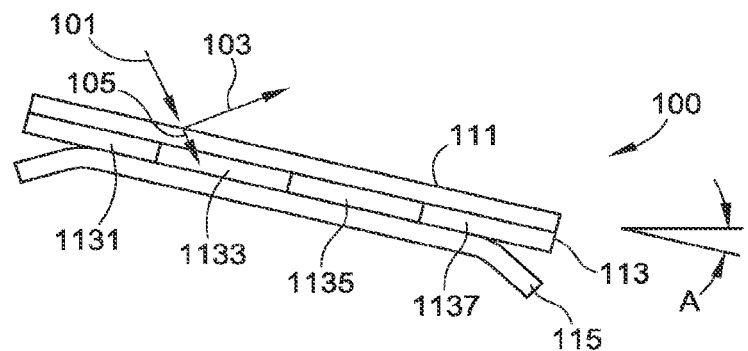
FIG. 1B depicts the micromirror optical device of FIG. 1A in an actuated position.

FIG. 1B depicts the micromirror optical device of FIG. 1A in an actuated position, arranged in accordance with at least some examples described herein.

When the first beam of incident light 101 of a selected wavelength is transmitted through a top layer 111 of a micromirror optical device 100 and is detected by a detection layer 113 of the micromirror optical device 100, one of an actuation layer 115 of the micromirror optical device 100 and an actuator may tilt, as depicted in FIG. 1B. In an example, the detection layer 113 may comprise a rigid dielectric substrate. The rigid dielectric substrate may include, but is not limited to, a plastic material and a composite material, among others. The rigid dielectric substrate may include electrical components that may be used to detect the first beam of incident light 101 of the certain wavelength that is transmitted through the top layer 111. The electrical components may include a conductor 1131, among others. The conductor 1131 may conduct electric power to the elements of an electrical circuit. The electrical circuit may include, for example, a resistor 1133, a metal-oxide-semiconductor field-effect transistor (MOSFET) 1135, and a photodiode 1137, among others.

In an example, the first beam of incident light 101 detected by a photodiode 1137 may activate a MOSFET 1135. The MOSFET 1135 may be a power transistor that may enable movement of the micromirror optical device 100 by one of the actuation layer 115 and the actuator. The actuator may be, but is not limited to, a microelectromechanical systems (MEMS) circuit, and a piezoelectric circuit, among others. The actuator may convert electrical energy to mechanical movement. In some examples, the actuator may tilt the micromirror optical device 100 in a way that is predetermined by the construction of the micromirror optical device 100 and the circuit of the micromirror optical device 100. As shown in FIG. 1B, actuation may cause the micromirror optical device 100 to tilt to an angle A, which may re-route the reflected light 103 from a first destination to a second destination, to a different path 105.

As noted in FIGS. 1A and 1B, the micromirror optical device 100 may change the actuated position to re-route the different path 105 of the reflected light 103 from the first destination to the second destination. The process of re-routing the different path 105 of the reflected light 103 from the first destination to the second destination may include, for example, the micromirror optical device 100 tilting to alter the angle of the micromirror optical device 100 with respect to the first beam of incident light 101.

Figure 1C:
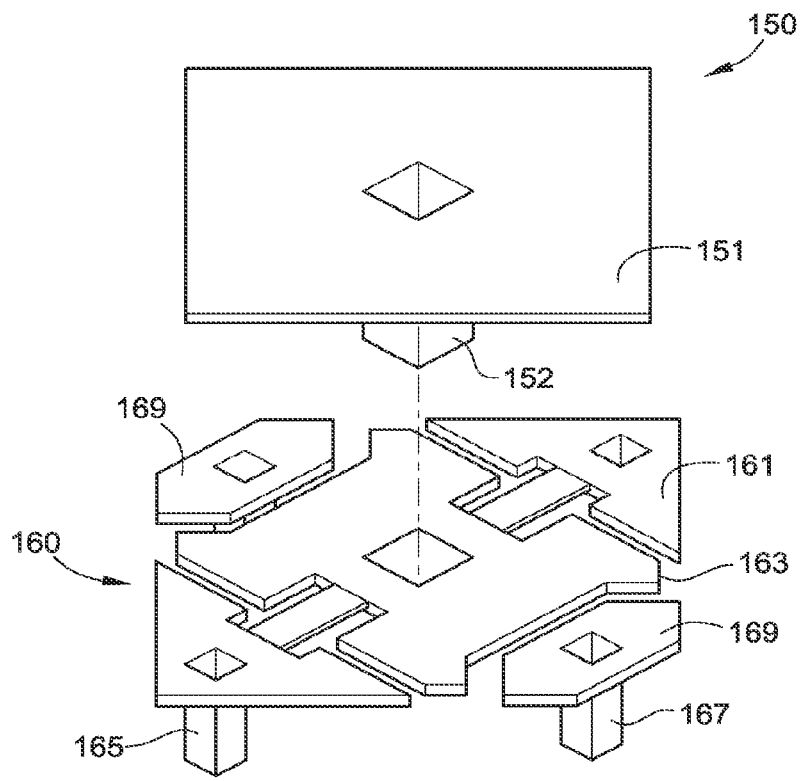
FIG. 1C depicts a second example of a micromirror optical device with details of how a position of the micromirror optical device may be changed.

FIG. 1C depicts a second example of a micromirror optical device with details of how a position of the micromirror optical device may be changed, arranged in accordance with at least some examples described herein.

In the FIG. 1C, a micromirror optical device 150 may include a top layer 151 and a tilting plate 160. The tilting plate 160 may support and may tilt the top layer 151 of the micromirror optical device 150. The micromirror optical device 150 may be supported by one of support posts 152, 165 and another base. The support posts 152, 165 and the other base may be mounted to the micromirror optical device 150.

Still referring to the FIG. 1C, the tilting plate 160 may include a torsion bar. A tilting hinge and/or the torsion bar 161 may tilt to the left and/or may tilt to the right, as shown in the FIG. 1C. The tilting hinge and/or the torsion bar 161 may mount a first electrode 163, which may be pivotally supported on the support posts 152, 165 (one visible in FIG. 1C). In some examples, the first electrode 163 may be a metal plate electrode. Two electrode posts 167 may mount a second electrode 169 on opposite sides of and below the level of the tilting hinge and/or the torsion bar 161 and the first electrode 163. The tilting hinge and/or the torsion bar 161 may pivot to the left and/or may pivot to the right in response to detection that the second electrode 169 is activated. The second electrode 169 may be activated when an external voltage is applied. In some examples, an actuator may continue to hold a position until a different control signal is received. As such, the actuation may be persistent over a period of time. Other tilting mechanisms may be used, such as examples of the micromirror optical device 150 with an additional layer that may incorporate stops, additional control circuitry, and the like.

In some examples, the micromirror optical device 150 may include a top layer. The top layer may selectively transmit light, depending on a wavelength of the light. In some examples, the top layer may reflect the light, depending on the wavelength of the light. The top layer may be, but is not limited to, a filter and another optical component, among others. The filter may be a dichroic filter. The other optical component may be configured to transmit a first wavelength of the light while reflecting a second wavelength of the light. Other wavelength-selective mirrors and/or beam splitters may be used.

Figure 1D:
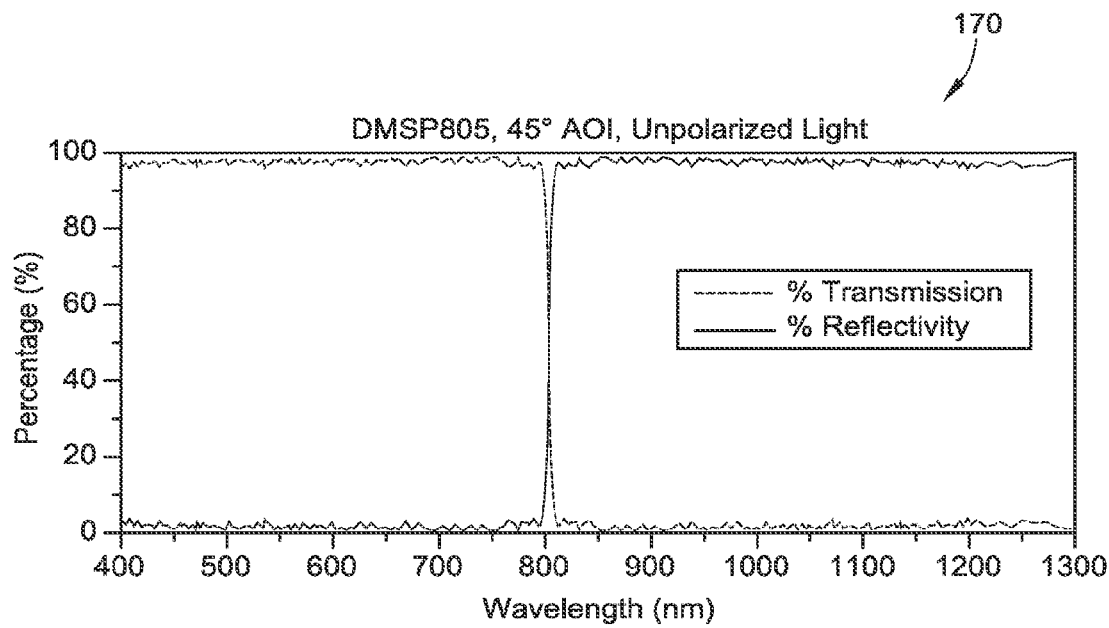
FIG. 1D is a graph of reflection/transmission performance of a first filter for use in a micromirror optical device of the present disclosure.
Figure 1E:
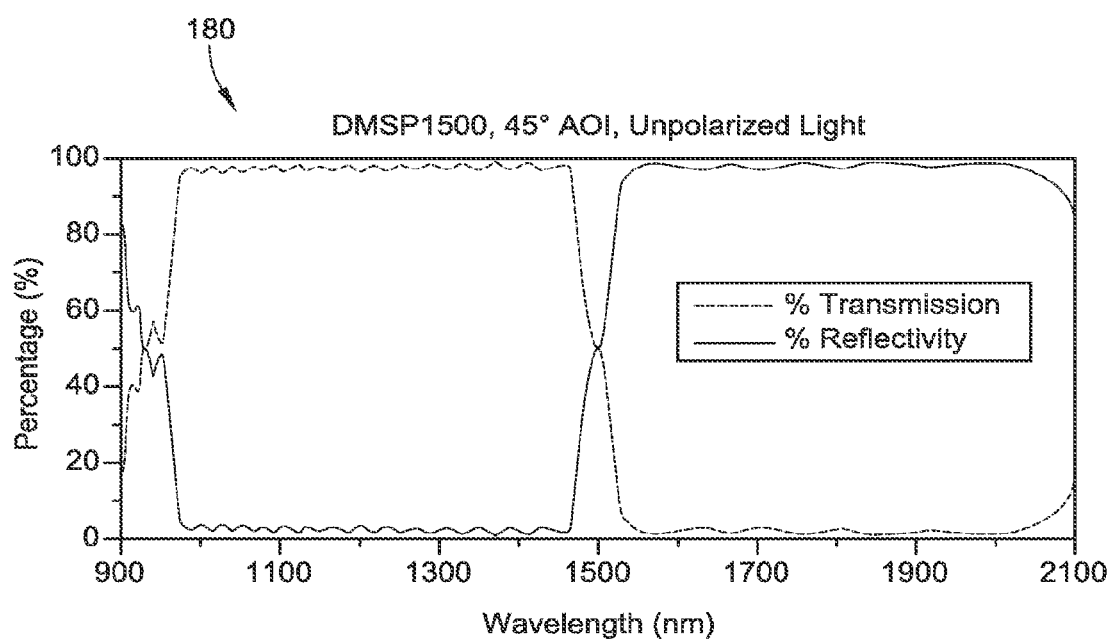
FIG. 1E is a graph of reflection/transmission performance of a second filter.

FIG. 1D is a graph of reflection/transmission performance of a first filter for use in a micromirror optical device of the present disclosure, arranged in accordance with at least some examples described herein. FIG. 1E is a graph of reflection/transmission performance of a second filter, arranged in accordance with at least some examples described herein.

FIGS. 1D and 1E depict example properties of a filter 170 and a filter 180, where the filter 170 and the filter 180 may be dichroic filters. The filter 170 and the filter 180 may be used in some examples available from Thorlabs, Newton, N.J., USA. The filter 170, in FIG. 1D, may transmit a beam of incident light at wavelengths below 800 nm. The filter 170 may reflect the beam of incident light at the wavelengths above 850 nm. The filter 180, in FIG. 1E, may allow reflection of the beam of incident light above the wavelengths of 1550 nm and below the wavelengths of 900 nm. The beam of incident light at the wavelengths in a range from 1000 nm to 1450 nm may be transmitted through the filter 180.

In some examples, a beam splitter may be configured with a narrow bandwidth. The narrow bandwidth may be, for example, a transmission bandwidth and/or a reflection bandwidth at the wavelengths of 100 nm or less. In some examples, the narrow bandwidth may be, for example, the transmission bandwidth and/or the reflection bandwidth at the wavelengths of 10 nm or less. In other examples, the narrow bandwidth may be, for example, the transmission bandwidth and/or the reflection bandwidth at the wavelengths of a single nm. In some examples, photodetectors with activation wavelengths may be seen, which may allow for distinguishable outputs.

The beam of incident light of the wavelengths may be used with switches of the present disclosure. In addition, the beam of incident light at the wavelengths of infrared light may be used. The beam of incident light at the wavelengths of the infrared light may be defined as the beam of incident light at the wavelengths from a range of 700 nm to 1 mm. The beam of incident light at the wavelengths in the near infrared region may also be used. The beam of incident light at the wavelengths in the near infrared region may be defined as the beam of incident light at the wavelengths from a range of about 700 nm to about 3000 nm (3 μm). The beam of incident light of other wavelengths may also being used. Many of the dichroic filters and/or the beam splitter may have cutoffs between the transmission bandwidth and/or the reflection bandwidth, where the beam of incident light may be at the wavelengths in the range of 700 to 1700 nm.

The beam of incident light traveling through air may travel at close to a speed of the beam of incident light in a vacuum. In contrast, the transmission of electrical signals may include delays, for example, due to the presence of reactive components. The reactive components may include, but are not limited to, capacitors and inductors, among others. Hence, the electrical signals transmitted using the beam of incident light may be transmitted faster than the speed of the electrical signals. In addition, a response time of microelectromechanical systems (MEMS) devices described herein, including piezoelectric actuators, may be fast. The MEMS devices may have switching times as low as 1 ns. In addition, the transmission time of a control signal over the beam of incident light may be negligible. Since the systems described herein may be used for multiple paths and multiple destinations, the savings in the switching times may be useful.

In some examples, the filters and/or the beam splitter may have performances of greater than 90% the transmission bandwidth and/or the reflection bandwidth of the wavelengths in the respective wavelength ranges. In the beam splitter of FIG. 1D, the transmission of the beam of incident light of the wavelengths from a range of 400 nm to 790 nm may be greater than 90%. If the beam of incident light of the wavelengths occurs from a range of 830 nm to 1300 nm, reflectance of the beam of incident light may be greater than 90%. The performance of the mirrors may depend on transmittance characteristics of the beam of incident light, as actuation may occur when the beam of incident light that encodes control instructions is transmitted through the beam splitter. Appropriate circuitry and control techniques may be used to avoid unwanted actuation. In some examples, Bragg reflectors may also be used. The Bragg reflectors may have reflective properties based on one or more of an incident angle and the wavelengths of the beam of incident light.

Control circuits and schemes to actuate the micromirror optical devices may be depicted in FIGS. 2A-2D. In the control circuits, a photodiode may detect light from the beam of incident light and/or a portion of the incident light that is transmitted through the beam splitter discussed above with respect to FIGS. 1A-1E. The photodiode may control an actuation circuit that may tilt the micromirror optical device. The tilting of the micromirror optical device may redirect the beam of incident light in accordance with instructions coded in a control portion of the incident light.

Figure 2A:
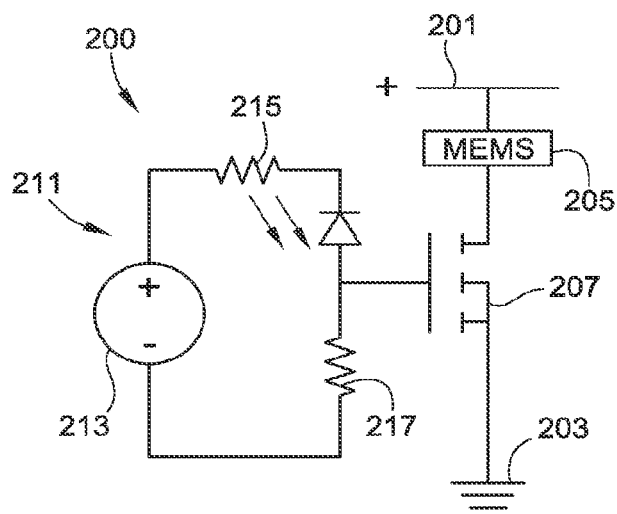
FIG. 2A is a schematic diagram illustrating an example circuit for control of a micromirror optical device with a photodiode and a metal-oxide-semiconductor field-effect transistor (MOSFET)
Figure 2B:
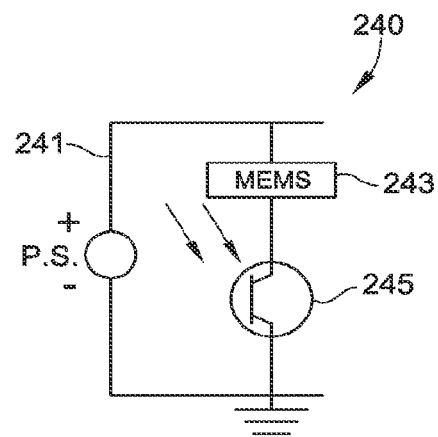
FIG. 2B is a schematic diagram illustrating a second example circuit for control of a micromirror optical device with a photodiode and a metal-oxide-semiconductor field-effect transistor (MOSFET)

FIGS. 2A and 2B depict circuits in which a microelectromechanical systems (MEMS) circuit may be actuated by the photodiode.

FIG. 2A is a schematic diagram illustrating an example circuit for control of a micromirror optical device with a photodiode and a metal-oxide-semiconductor field-effect transistor (MOSFET), arranged in accordance with at least some examples described herein.

In FIG. 2A, a control circuit 200 may include a power source 201, a return ground 203, a microelectromechanical systems (MEMS) actuator 205, and the MOSFET 207, among other elements. The MEMS actuator 205 may be quiescent until a photodiode circuit 211 is activated by a beam of incident light striking a photodiode 215. A current limiting resistor 217 may be in series with the photodiode 215, powered by the power source 201 and/or another power source 213. The power source 201 may be a battery. When the photodiode 215 is actuated, the MOSFET 207 may be actuated and current may flow through the MEMS circuit, commanding the micromirror optical device to tilt and/or to change an orientation to the beam of incident light. As the MEMS circuit is electrostatic, change in position of the MEMS circuit may be persistent until another change may be dictated by the beam of incident light from the beam splitter.

FIG. 2B is a schematic diagram illustrating a second example circuit for control of a micromirror optical device with a photodiode and a metal-oxide-semiconductor field-effect transistor (MOSFET), arranged in accordance with at least some examples described herein.

FIG. 2B is an example with simplified circuitry. A control circuit 240 may include a power supply 241, a microelectromechanical systems (MEMS) actuator 243, and a photodiode 245, among other elements. The principle of operation for FIG. 2B may be similar to that of FIG. 2A. When the beam of incident light of a wavelength is transmitted through a beam splitter, the beam of incident light may strike the photodiode 245. When the beam of incident light strikes the photodiode 245, activation of the control circuit 240 may occur. The activation of the control circuit may allow current to flow through the MEMS actuator 243. If a MEMS circuit of FIG. 2B is also an electrostatic circuit, the MEMS circuit may be persistent, without a need for constant refreshing. In the control circuit 240 of FIG. 2B, the photodiode 245 and/or another photodetector component may be used to withstand higher voltage than in the circuit of FIG. 2A.

Figure 2C:
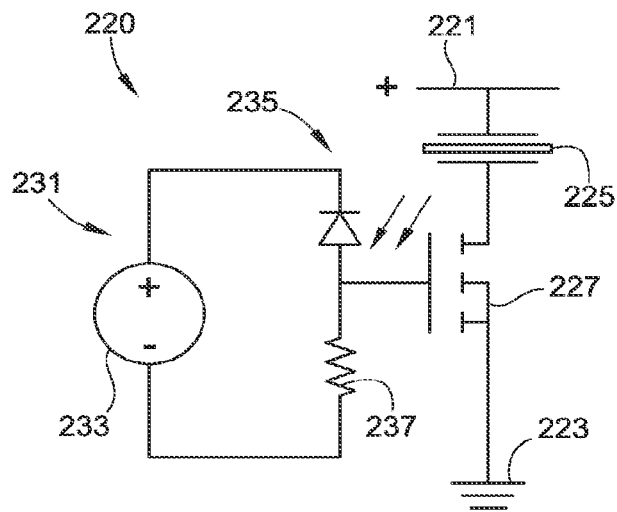
FIG. 2C is a schematic diagram illustrating an example circuit for control of a micromirror optical device with a photodiode.
Figure 2D:
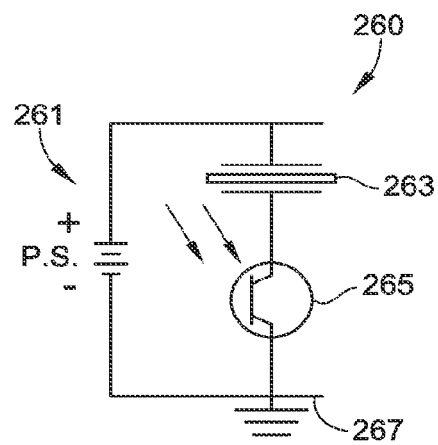
FIG. 2D is a schematic diagram illustrating a second example circuit for control of a micromirror optical device with a photodiode.

FIGS. 2C and 2D depict piezoelectric microelectromechanical systems (MEMS) circuits in which the photodiode actuates a piezoelectric control circuit to tilt or reorient the mirror.

FIG. 2D is a schematic diagram illustrating an example circuit for control of a micromirror optical device with a photodiode, arranged in accordance with at least some examples described herein.

FIG. 2C illustrates a first example of a piezoelectric control circuit 220. The piezoelectric control circuit 220 may include power supplies 221 and 223 for a piezoelectric actuator 225 and a metal-oxide-semiconductor field-effect transistor (MOSFET) driver 227. A photodiode portion 231 of the piezoelectric control circuit 220 may include the power supplies 221 and 233, a photodiode 235, and a limiting resistor 237. The power supplies 221 and 233 may be a battery. The limiting resistor 237 may be in series with the power supplies 221 and 233. When a beam of incident light from a beam splitter strikes the photodiode 235, the photodiode 235 may be activated. When the photodiode 235 is activated, current may flow through the MOSFET driver 227 and the piezoelectric actuator 225. A micromirror optical device may then move to a position and the path of the reflected light may change.

FIG. 2D is a schematic diagram illustrating a second example circuit for control of a micromirror optical device with a photodiode, arranged in accordance with at least some examples described herein.

A control circuit 260 is depicted in FIG. 2D. Power supplies 261, 267 may be connected to a piezoelectric microelectromechanical systems (MEMS) actuator 263 and a photodiode 265. In some examples, the photodiode 265 may be an avalanche diode. When the photodiode 265 is activated, the control circuit 260 may close and the piezoelectric MEMS actuator 263 may move and/or may tilt the micromirror optical device in the manner described above. The photodiode 265 may be subject to higher voltages than the photodiode 235 of FIG. 2C. Additional circuitry, such as capacitors and additional control circuits, may be used to add persistence to the piezoelectric MEMS actuator 263, so that the micromirror optical device may hold a position over time.

The circuits of FIGS. 2A-2D may include multiple MEMS devices. The multiple MEMS devices may include one or more of a piezoelectric cantilever, a bimorph device, and an electro-static actuator, among others, such as the example of FIG. 1E. Actuators that work on electrostatic attraction between charged plates may provide an added benefit of persistence, without utilizing continual illumination of the micromirror optical device by the control wavelength of the beam of incident light, and/or continual refreshing of a signal and/or a command, to maintain a selected state. In FIGS. 2A and 2C, the photodiode 215 and the photodiode 235 may be activated by the power source 213 and 233 and the power supplies 221 and 223 at a different voltage than the control circuit 200 and the piezoelectric control circuit 220 used for the MEMS actuator 205 and the piezoelectric actuator 225. In these circuits, the photodiode 215 and the photodiode 235 may control the gates of the MOSFETs. In these circuits, the photodiode 215 and the photodiode 235 may not be directly in the power portion of the circuits. In the simpler circuits of FIGS. 2B and 2D, the photodiodes 245, 265 may be capable of higher voltages than the photodiode 215 and the photodiode 235 of FIGS. 2A and 2C, since the photodiodes 245, 265 may be in the power circuits for the MEMS actuator 243 and the piezoelectric MEMS actuator 263.

One or more of the circuits, the actuators, and/or the micromirror optical devices of FIGS. 2A-2D may be small. Using micro-circuits and the above-described beam splitter, the beam splitter with photodetectors and with the wavelength of the beam of incident light may be used to route data and/or to route communications. The routing may include several stages and/or several possible paths. The communication may be two-way communication. The micromirror optical devices may include mirrors, and described here, with two states. The two states may include a normal state and an activated state. The normal state may exist when the beam of incident light may be reflected in a first direction. The activated state may exist when the beam of incident light may be reflected in a second direction. Other examples, as described below, may include mirrors that have more than two possible states and/or more than two orientations in which to reflect the beam of incident light. Other actuators may also be used. For example, comb-type actuators have been developed for a variety of micro-miniature and even semiconductor scale applications. The comb-type actuators have been developed for micro-miniature motors that may move back and forth upon actuation. The comb-type actuators may have the advantage of utilizing a connection to the stator, not the rotor, for operation. See *A Comb-Drive Actuator Driven by Capacitively-Coupled Power*, Chao-Min Chang et al., Sensors 2012, 12, pp. 10881-10889, which is hereby incorporated by reference in its entirety. Opposite sides of positive connections and negative connections may comprise series of teeth that may resemble two interlocked combs in the comb-drive actuators. The surface area of the teeth may provide for the capacitive coupling between the two.

Figure 3:
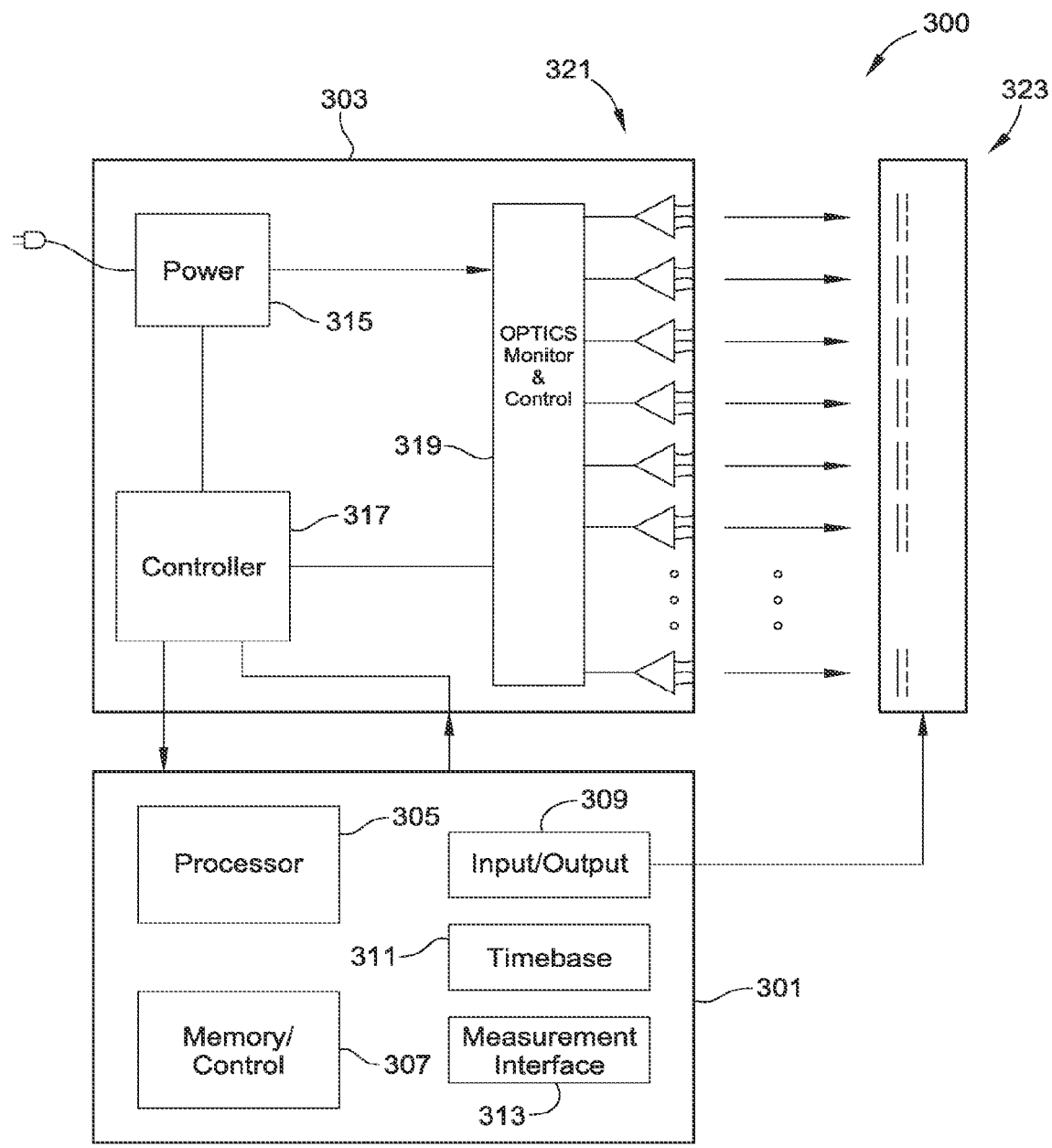
FIG. 3 is a block diagram of a communications circuit using light of a plurality of wavelengths for controlling and transmitting information.

FIG. 3 is a block diagram of a communications circuit using light of a plurality of wavelengths for controlling and transmitting information, arranged in accordance with at least some examples described herein.

A block diagram of a communications circuit 300 using a beam of incident light of a plurality of wavelengths for controlling and for transmitting information is depicted in FIG. 3. The communications circuit 300 may include control circuitry 301 and 303, a power supply 315, optics monitoring and control circuitry 319, and a plurality of light sources 321, among other elements. The optics monitoring and control circuitry 319 may encode and emit the beam of incident light from the plurality of light sources 321 to an arrangement of micromirror optical devices 323, as described previously. The arrangement of micromirror optical devices 323 may reflect the emitted light and may transmit the emitted light to destinations along paths. The communications circuit 300 may also include light detectors for detecting the emitted light coming from the arrangement of micromirror optical devices 323 for when the communications circuit 300 may become the destinations of light-encoded messages from other optical circuits.

In an example, the control circuitry 301 and 303 may include a microprocessor 305 and a memory 307. The memory 307 may be read-only memory (ROM), random access memory (RAM), or both. The ROM memory may be suitable for storing a computer program for controlling and operating the communications circuit 300. The control circuitry 301 and 303 may also include input/output circuitry 309 for detecting light outputs and the beam of incident light from the plurality of light sources 321. The control circuitry 301 and 303 may also include a clock and/or an oscillator for providing a time base 311 for the system. The control circuitry 301 and 303 may also include measurement interface circuitry 313. The measurement interface circuitry 313 may be used, for example, for periodically checking and/or calibrating aspects of the communications circuit 300.

The plurality of light sources 321 may include light-emitting diodes (LEDs), laser diodes, and the like. The plurality of light sources 321 may be controlled in a digital manner to emit light signals, where the light signals may include the plurality of wavelengths of the beam of incident light, as well as control data and/or information data that is to be transmitted from a source, such as the communications circuit 300 to a destination (not shown). The control data may include data related to the destinations of the beam of incident light, the plurality of wavelengths of the beam of incident light, as well as other encoded information. The control data may be encoded at the plurality of wavelengths of the beam of incident light, such as a first wavelength to actuate a first micromirror optical device and a second wavelength to actuate a second micromirror optical device. The information data may be encoded.

The information data may be encoded and may be sent using the plurality of wavelengths of the beam of incident light that are reflected by the arrangement of micromirror optical devices 323, along the paths of the beam of incident light encoding the information data. If the beam of incident light that encodes the information data is transmitted by the arrangement of micromirror optical devices 323, rather than reflected, some and/or all of the information data may be lost in the transmission of the optical message. Hence, the arrangement of micromirror optical devices 323 may be configured so that the beam of incident light encoding the information data may be reflected by each micromirror optical device. For example, the beam of incident light encoding the information data may have a reflectance of at least 90% at the plurality of wavelengths of the beam of incident light. In other examples, the beam of incident light encoding the information data may have a reflectance of at least 95%. In further examples, the beam of incident light encoding the information data may have a reflectance of at least 98%.

The optics monitoring and control circuitry 319 may include optical switches, such as logic gates. The optical switches may be used for turning the plurality of light sources 321 on and off to precisely encode and emit the light signals. The emitted light signals may include information in a digital format. In some examples, a control section as described in FIG. 3 may not extend beyond control of the beam of incident light that is emitted from the plurality of light sources 321. The control of the beam of incident light may include encoding all the information data that is intended for transmission to the destinations, as well as the control data that is used for routing the beam of incident light to be reflected from one mirror or mirror set to another, downstream mirror or mirror set. In these examples, the paths from a sending station and/or the communications circuit 300 may be intended to be remote from the control circuitry 301 and 303. That is, the operation, actuation and movement of the downstream mirrors may not be controlled by the control circuitry 301 and 303.

As stated, the actuation and the movement of the downstream mirrors may be controlled by output light from the plurality of light sources 321. The plurality of light sources 321 may be of differing wavelengths. The output light from the plurality of light sources 321 may impinge on the arrangement of micromirror optical devices 323. The output light from the plurality of light sources 321 may be reflected from the arrangement of micromirror optical devices 323. In some examples, the output light form the plurality of light sources 321 may be transmitted through the arrangement of micromirror optical devices 323. The paths may be controlled, as explained herein. In some examples, the paths may be controlled from a signal from a microcontroller 317 and/or the microprocessor 305 to the arrangement of micromirror optical devices 323.

Feedback may be advantageous as to which state the arrangement of micromirror optical devices 323 and the actuators may reside in. The feedback may come from additional circuitry in the arrangement of micromirror optical devices 323 and from the feedback to the communications circuit 300. Such circuitry may be added, but is not for the primary disclosure herein of the arrangement of micromirror optical devices 323 that are controlled by emission, transmission, and reflection of the beam of incident light. For example, the destinations of the beam of incident light may signal that the destinations have received a first transmission and/or a warning. The destinations of the beam of incident light may then signal the source of the beam of incident light to send the message and to confirm receipt of the message. The paths of the beam of incident light may be suitable for transmission and/or for signals, for example, the beam of incident light, in two directions, back and forth between the sending station and the destinations. Communication in both directions may occur via light transmission and routing based on the beam of incident light.

In some examples, the arrangement of the micromirror optical devices 323 may use a beam splitter and/or a dichroic filter. The beam splitter and/or the dichroic filter may be operative to react to the beam of incident light at the plurality of wavelengths. The beam splitter and/or the dichroic filter may tilt the actuators and may redirect the beam of incident light that is not transmitted through the beam splitter. In some examples, the beam splitter and/or the dichroic filter may react to the beam of incident light in the plurality of wavelengths, to tilt the actuators and to redirect the beam of incident light that is not transmitted through the beam splitter. The arrangement of the micromirror optical devices 323 may be configured and may be used to transmit the message from the sending station to the destinations using the described optical technique. Using multiple channels in the optical switches, the communications circuit 300 of binary optical switches may be set up using the arrangement of micromirror optical devices 323, where the arrangement of micromirror optical devices 323 may each have a micromirror. In some examples, the arrangement of micromirror optical devices 323 may further include additional layers. The additional layers may include, but are not limited to, beam splitter layers, dichroic filter layers, and the like.

Figure 4:
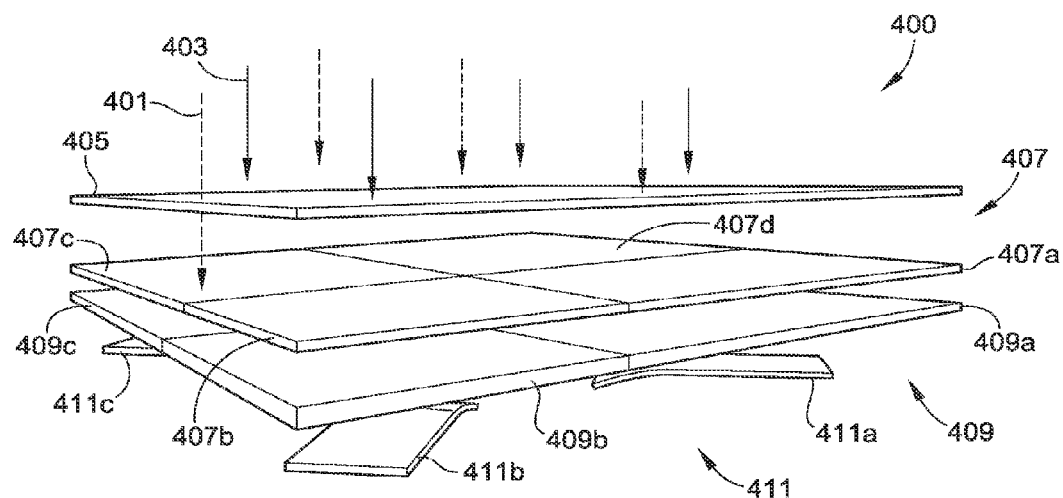
FIG. 4 is an example of an array or assembly of a plurality of mirrors according to the present disclosure.

FIG. 4 is an example of an array or assembly of a plurality of mirrors according to the present disclosure, arranged in accordance with at least some examples described herein.

FIG. 4 depicts a micromirror optical device 400, which may be an assembly of distinct and separate sub-micromirrors 405a, 405b, 405c, and 405d. The sub-micromirrors 405a, 405b, 405c, and 405d may receive a first beam of incident light of a first wavelength 401 and a second beam of incident light of a second wavelength 403. Broken lines may represent the first beam of incident light of the first wavelength 401 with encoded control data. Solid lines may represent information data. As depicted in FIG. 4, the example may use four pairs of the first beam and the second beam of incident light, where each pair of the incident light may be used for each sub-micromirror.

The behavior of the micromirror optical device 400 may be governed by a logic and control circuit. The logic and control circuit may receive inputs from the sub-micromirrors 405a, 405b, 405c, and 405d. A first layer 405 of the micromirror optical device 400 may include a separate, selectable beam splitter layer on each quadrant of the sub-micromirrors 405a, 405b, 405c, and 405d. In some examples, more than one of the sub-micromirrors 405a, 405b, 405c, and 405d may have the same beam splitter. In some examples, a separate sub-micromirror 405a, 405b, 405c, and 405d may be used for each section of the micromirror optical device 400. For example, four different dichroic filters may be used and may allow the micromirror optical device 400 to direct the first beam of incident light of the first wavelength 401 and/or the second beam of incident light of the second wavelength 403 to the destination(s). In an example, the first layer 405, a second layer 407, (e.g., a beam spliter top layer),and/or a third layer 409 may be structurally tied to each other. A fourth layer 411 may be stationary and may allow tilting and/or maneuvering of the first layer 405, the second layer 407, and the third layer 409 together. The fourth layer 411 may include quadrants 411a, 411b, and 411c.

Each of the sub-micromirrors 405a, 405b, 405c, and 405d may occupy one of the quadrants of the first layer 405. Different numbers and arrangements of separate sections of the micromirror optical device 400 and corresponding sub-micromirrors 405a, 405b, 405c, and 405d may also be used. Light pairs that may be incident on one of the sub-micromirrors 405a, 405b, 405c, and 405d of the first layer 405. The light pairs may be incident on differing sub-micromirrors 405a, 405b, 405c, and 405d of the first layer 405, which may allow for additional modes of control of the tilting and/or orientation of the micromirror optical device 400. In some examples, the light pairs incident on the differing sub-micromirrors 405a, 405b, 405c, and 405d of the first layer 405 may allow for the selection of the path and the destination of the first beam of incident light of a first wavelength 401 and/or the second beam of incident light of the second wavelength 403. As such, in some examples, the incident light may include a control wavelength and a data wavelength for each of the sub-micromirrors 405a, 405b, 405c, and 405d of the first layer 405. In some examples, a total of at least eight wavelengths of incident light onto the micromirror optical device 400 may occur. The number of wavelengths used may be selected according to system requirements, and is not limited to eight wavelengths. For example, more than eight wavelengths may allow for additional control and instructions by one or more additional sub-micromirrors, additional micromirror arrays, and/or other arrangement, in series with the micromirror optical device 400.

The second layer 407, the detection layer, may be divided into quadrants 407a, 407b, 407c, and 407d. The second layer 407 may include a rigid dielectric substrate. The quadrants 407a, 407b, 407c, and 407d of the second layer 407 may be configured as a photodetection layer, among others. The photodetection layer may be used for detecting light transmitted through the sub-micromirrors 405a, 405b, 405c, and 405d of the first layer 405.

The third layer 409 may include circuitry and logic components, 409a, 409b, 409c, and 409d. The circuitry and logic components, 409a, 409b, 409c, and 409d may be used for operation of the micromirror optical device 400. The fourth layer 411 may be an actuation layer. The actuation layer may be designed to tilt the micromirror optical device 400 in the direction. The first layer 405, the second layer 407, the third layer 409, and the fourth layer 411 may function differently, however, from the single actuation layer in the above figures.

The micromirror optical device 400 may be designed so that the micromirror optical device 400 may tilt in four ways. The micromirror optical device 400 may lie in an initial plane. To use the example of FIG. 4, when the micromirror optical device 400 tilts and/or actuates, the micromirror optical device 400 may tilt and/or incline toward one of the first, toward the bottom, toward the left, and toward the right. The micromirror optical device 400 may be a single entity, which may include four quadrants. In the example, the quadrants 407a, 407b, 407c, and 407d of the second layer 407 may move in tandem as a compromise and/or as a result of the instructions from the quadrants 407a, 407b, 407c, and 407d of the second layer 407.

Tilting to each of the four directions, toward the bottom, toward the left, toward the right, and toward the top, the micromirror optical device 400 may direct the reflected light to a different path and to a different destination. In the example, if the quadrants 407a and 407b are activated, the micromirror optical device 400 may tilt toward the bottom. If the quadrants 407c and 407d are activated, the micromirror optical device 400 may tilt toward the top. Leftward and rightward tilts may be accomplished using, respectively, activation of the quadrants 407b and 407c, and activation of quadrants 407a and 407d. As such, the path of the light may be logically controlled using the inputs to the quadrants 407a, 407b, 407c and 407d. Space and complications may be minimized, since the example of FIG. 4 may route information to any of four paths and/or the destinations. The examples of FIGS. 1A-1B are binary, and as such, the reflected light may be routable to a first default destination and/or to a second, alternate destination.

The fourth layer 411, the actuation layer, may include electrostatic microelectromechanical systems (MEMS) actuators. The MEMS actuators may cause the tilting, in the same manner depicted in FIGS. 1A-1C. In some examples, different actuation circuits may also be used. For example, two torsion hinges may allow the first three layers to tilt toward the bottom, to tilt toward the left, to tilt toward the right, and to tilt toward the top in response to actuation of the electrode in the fourth layer 411. In some examples, piezoelectric actuators may be used, where the circuitry and the logic components 409a, 409b, 409c, and 409d may dictate that the first layer 405, the second layer 407, and the third layer 409 may incline toward the bottom, toward the left, toward the right, and toward the top.

Figure 5:
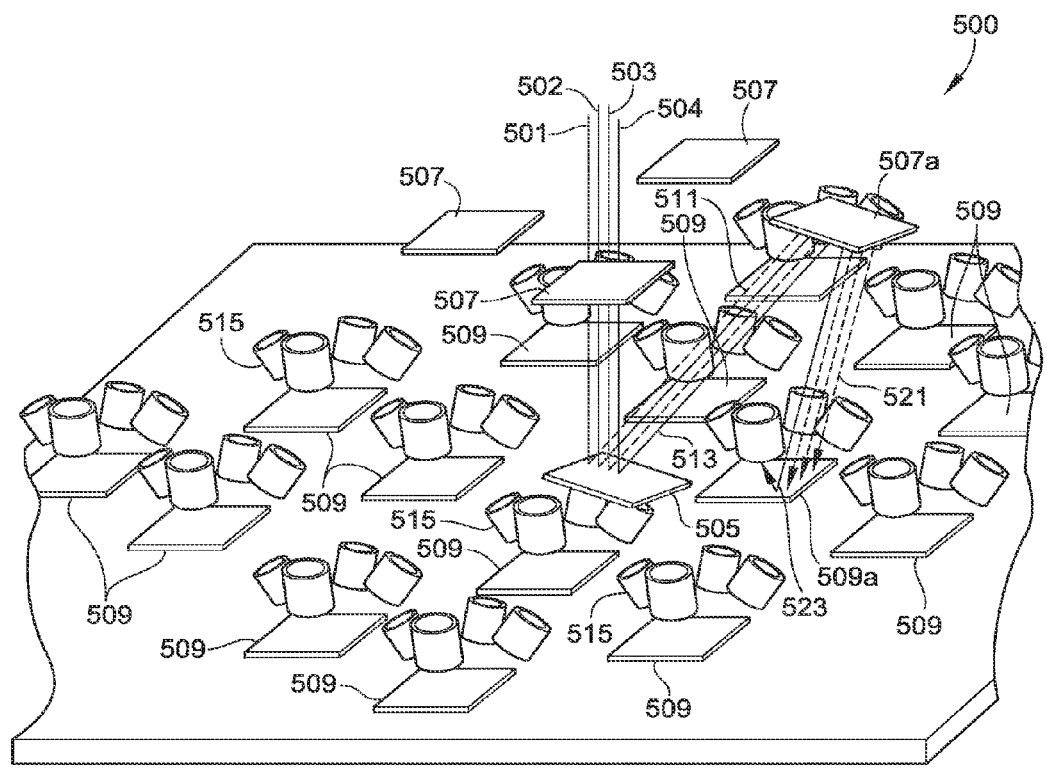
FIG. 5 is an example of a system with separately spaced and separately controlled micromirror optical devices for controlling the transmission of information.

FIG. 5 is an example of a system with separately spaced and separately controlled micromirror optical devices for controlling the transmission of information, arranged in accordance with at least some examples described herein.

A micromirror optical device of FIG. 5 may be multi-directional and may be multi-wavelength responsive. The micromirror optical device may be used in circuits, such as a communication system 500, where the micromirror optical device may include a plurality of arranged micromirrors 505, 507, and 509. In the communication system 500, the plurality of arranged micromirrors 505, 507, and 509 may receive beams of incident light 501, 502, 503, and 504. The beams of incident light 501, 502, 503, and 504 may include light of a plurality of wavelengths, where the beams of incident light 501, 502, 503, and 504 may have encoded control data and information data 513. The information data 513 may be depicted using solid lines. The beams of incident light 501, 502, 503, and 504 may be incident on the plurality of arranged micromirrors 505, 507, and 509, depicted as a single micromirror in FIG. 5. The beams of incident light 501, 502, 503, and 504 may be reflected without transmitting the beams of incident light 501, 502, 503, and 504 through the plurality of arranged micromirrors 505, 507, and 509 to cause actuation and re-routing of the reflected light 511 and 521. The reflected light 511 and 521 may be depicted by broken lines.

The plurality of arranged micromirrors 505, 507, and 509 may act as a single micromirror when moving, but the movement of the plurality of arranged micromirrors 505, 507, and 509 may be a result of photodetectors 515 and 523 reacting to the light that is transmitted through the portions of the beam splitter top layer, which, like the second layer 407 (e.g., the beam splitter top layer)in FIG. 4, may include four different portions. The four portions may each allow light of a wavelength, and/or a wavelength range, to reach the photodetector circuit below that portion of the second layer. In the system of FIG. 5, the beams of incident light 501, 502, 503, and 504 may impinge in a downward vertical direction on a first micromirror array 505. The reflected light 511 and 521 from the first micromirror array 505 may be directed upwards to a second micromirror array 507. Light from the second micromirror array 507 may then be directed in a downward direction toward a third micromirror array 509. The plurality of arranged micromirrors 505, 507, and 509 may include the photodetectors 515 and 523 depicted as cylinders.

Alternatively, the beams of incident light 501, 502, 503, and 504 may be partially transmitted through one or more quadrants of the plurality of arranged micromirrors 505, 507, and 509. In an example, the actuation portion may actuate and cause the plurality of arranged micromirrors 505, 507, and 509 to tilt in a direction, per the encoded instructions. The reflected light 511 and 521 may be reflected in a different direction, causing the reflected light 511 and 521 to go in a different direction and/or a different path. If actuation is not needed, the beams of incident light 501, 502, 503, and 504 may reflect from the first micromirror array 505 to a second micromirror 507a and then to a third micromirror 509a, and so forth. In response to a determination that the beams of incident light 501, 502, 503, and 504 may include light of the plurality of wavelengths, the plurality of arranged micromirrors 505, 507, and 509 may tilt in the direction and may redirect the reflected light 511 and 521 to a different path and/or to an alternate destination. FIG. 5 is intended to show how the signals may be multiplexed and used to redirect the reflected light 511 and 521, and the information in a variety of paths.

Figure 6:
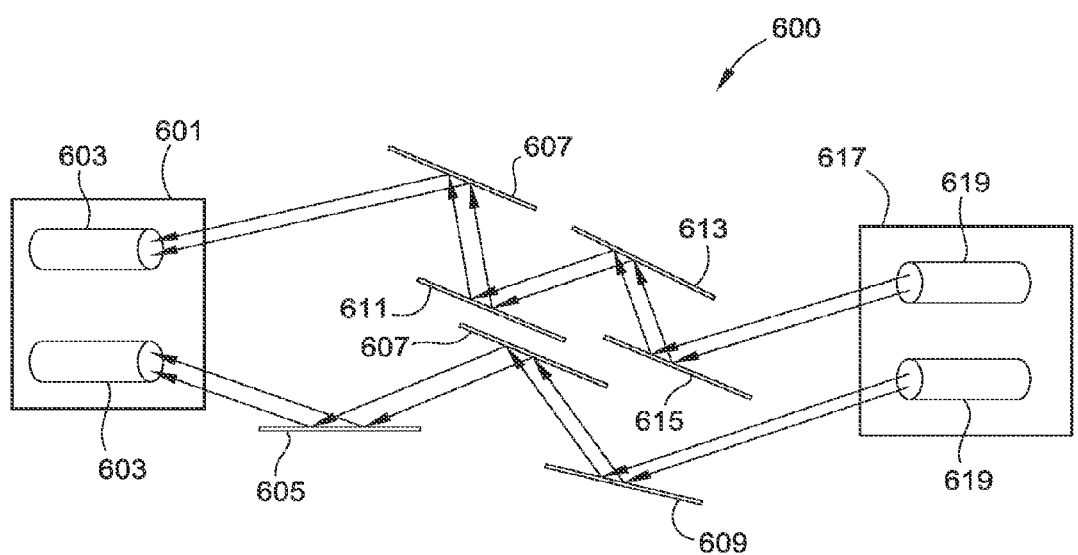
FIG. 6 is an example of a system of separately spaced and separately controlled micromirror optical devices for two-way transmission of information via light of different wavelengths, all arranged in accordance with at least some examples as described herein.

FIG. 6 is an example of a system of separately spaced and separately controlled micromirror optical devices for two-way transmission of information via light of different wavelengths, arranged in accordance with at least some examples described herein.

A two-way system 600 for self-contained and optically-controlled micromirrors, as described herein, is now described. FIG. 6 depicts the two-way system 600 of the self-contained and the optically controlled micromirrors. The two-way system 600 may be used for two-way transmission of information via beams of incident light of different wavelengths. In the two-way system 600, a first communications circuit 601 may be a first station and/or a first node in the first communications circuit 601. The first node in the first communications circuit 601 may be a source node. The first communications circuit 601 may include two light emitting and detecting devices 603. A second communications circuit 617 may include destination light emitting and detecting devices 619. The two-way system 600 may include a plurality of source and destination nodes, in addition to the two that are shown.

The two-way system 600 may include a first path and a second path. The first path may include micromirror optical devices 605, 607, and 609. The second path may include micromirror optical devices 607, 611, 613, and 615. The micromirror optical devices 605, 607, and 609 of the first path and the micromirror optical devices 607, 611, 613, and 615 of the second path may be capable of binary states. In some examples, the micromirror optical devices 605, 607, and 609 of the first path and the micromirror optical devices 607, 611, 613, and 615 of the second path may be capable of assuming one of four different states. Other examples may include the micromirror optical devices 605, 607, and 609 of the first path and the micromirror optical devices 607, 611, 613, and 615 of the second path being capable of assuming a different number of states and/or a different number of positions, as long as the micromirror optical devices 605, 607, and 609 of the first path and the micromirror optical devices 607, 611, 613, and 615 of the second path are capable of at least two positions, so that the path may be altered. As is well known to those in the art, the first path and the second path may include devices which may have a single state and may not change an incident light path. The devices, as is well known to those in the art, may include, but are not limited to, boosters, repeaters, and retransmission stations, among others.

In some examples, the micromirror optical devices 605, 607, and 609 of the first path and the micromirror optical devices 607, 611, 613, and 615 of the second path may operate independently of the nodes and/or of the first communications circuit 601 and the second communications circuit 617. As described above, the position and the orientation of the micromirror optical devices 605, 607, and 609 of the first path and the micromirror optical devices 607, 611, 613, and 615 of the second path may depend on how the micromirror optical devices 605, 607, and 609 of the first path and the micromirror optical devices 607, 611, 613, and 615 of the second path have been trained and/or programmed, and the beams of incident light that are transmitted through the top layer beam splitter. In some examples, each of the micromirror optical devices 605, 607, and 609 of the first path and the micromirror optical devices 607, 611, 613, and 615 of the second path may not be one or more of programmable, programmed, and under computer control as performance position dictated by the beams of incident light and the beam splitter selected. Each of the micromirror optical devices 605, 607, and 609 of the first path and the micromirror optical devices 607, 611, 613, and 615 of the second path may be self-contained and may be part of a network, connected by the light paths between the micromirror optical devices 605, 607, and 609 of the first path and the micromirror optical devices 607, 611, 613, and 615 of the second path and the nodes, but not connected in other ways. The other ways may include one or more of feedback and/or other control circuits, which are not needed for transmission of messages between the nodes and/or the first communications circuit 601 and the second communications circuit 617.

While examples have been discussed above using specific examples, components, and configurations, they are intended to provide a general guideline to be used for transmitting information via light. These examples do not constitute a limitation on the examples, which may be implemented using other components, modules, and configurations using the principles described herein. Furthermore, actions discussed above may be performed in various orders, especially in an interlaced fashion.

The present disclosure contains information that is useful for routing optical communications along a plurality of pathways. By selective re-routing, the communicated information and/or the data may be sent to a plurality of destinations and/or nodes in the network and/or system of interest. No additional logic or connections may be needed for the re-routing, since one portion of the light may contain the instructions the micromirrors need to know. The micromirror design disclosed here may be most useful for short distances, for example from one or more of chip-to-chip communication and free-space communication, that may be accomplished without benefits of a fiber optic and/or another medium to contain the light. The disclosure may especially be useful for optical backplane technology, in which optics may be used for distribution of information, rather than electrical signals.

Applications may include shorter distances in which the information may be routed without needing additional connectors and/or additional circuits. The applications may be made in environments with a minimum of interference. The minimum of interference may include, for example, stray light, smoke, and/or other physical interruptions and/or interferences. As such, communications within one or more of an instrumentation rack, computer racks, data centers, and the like, may benefit from the disclosure. As noted, the light may provide the routing instructions and the information to be distributed. In addition, the communications may be two-way communications between a sending node and a receiving node. In more complex systems, the system may have multiple reciprocal paths, in that information may be transmitted back and forth along each path of the system. As such, a great variety of nodes and/or stations may remain in communication without additional connectors, logic, and wiring, among others.

For instance, in an optical backplane with electronic circuits for power delivery, the flexible switching supplied by the present disclosure may provide all the needed capability for in-site re-routing of data streams. The dispersion resulting from free-space routing of optical signals will be minimized by using short distances, for example, one or more of chip-to-chip on a circuit board and between closely-coupled chips adjacent to each other and perhaps on different boards or sub-assemblies. The present disclosure may reduce the hardware needed for interconnections, while retaining the flexibility for re-routing as quickly as the optical sources and controls can be reprogrammed. Note that programming and reconfiguration should not be needed for the micromirrors themselves, as the coded light may provide all the instructions the micromirrors need for routing the information by optical means.

While the micromirrors of the present disclosure may find optimal use in short distances where optical interference is kept to a minimum, the light and, as such, the information contained therein, may be routed to other installations by other optical techniques. As such, standard fiber optic cables may be used for longer distance transmission of the information, for instance, to another network or installation. Information from one computer rack and/or a data center may be routed to a distant rack and/or a distant data center by fiber optics. Distribution within each rack may be handled by the micromirror examples described herein.

According to some examples, the present disclosure describes an example optical device. The example optical device may include a mirror, a detection layer, and an actuator element coupled to the mirror. The mirror may be configured to receive a first incident beam encoded with information data and control data at an angle of incidence. The mirror may also be configured to reflect the information data and transmit the control data. The detection layer may be configured to receive the control data transmitted by the mirror. The detection layer may also be configured to generate a first electrical signal in response to the control data. The actuator element may be configured to alter the angle of incidence of the mirror in response to the first electrical signal.

According to other examples, the information data may include information data encoded on a first wavelength. In some examples, the control data may include the control data encoded on a second wavelength. In some examples, the mirror may be configured to reflect the information data at the first wavelength. In some examples, the mirror may additionally be configured to transmit the control data at the second wavelength.

According to different examples, the first incident beam may be further encoded with second control data at a third wavelength. In some examples, the mirror may be further configured to reflect the second control data at the third wavelength. In different examples, the mirror may be configured to adjust the angle of incidence to reflect the information data at the first wavelength. In some examples, the mirror may be further configured to adjust the angle of incidence to reflect the second control data at the third wavelength to a second optical device.

According to other examples, the reflected portion of the incident beam may form a second incident beam to the second optical device. The second optical device may include a second mirror, a second detection layer, and a second actuator element coupled to the mirror. The second mirror may be configured to receive the second incident beam at an angle of incidence. The second mirror may additionally be configured to reflect the information data at the first wavelength and may transmit the second control data at the third wavelength. The second detection layer may be configured to receive the second control data at the third wavelength transmitted by the second mirror. The second detection layer may additionally be configured to generate a second electrical signal in response to the second control data. The second actuator element may be configured to alter the angle of incidence of the second mirror in response to the second electrical signal.

According to some examples, the actuator element may be one of an electromechanical actuator, a piezoelectric actuator, and a comb-drive actuator. In some examples, the actuator element may be configured to rotate the mirror about an axis of rotation. According to further examples, the mirror may comprise an optical element may be a dichroic filter, a dielectric mirror, a beam splitter, and a Bragg reflector.

According to other examples, the detection layer may be adjacent the mirror and may be configured to receive transmitted light passed through the mirror.

According to other examples, the present disclosure describes an example optical system. The example optical system may include a target device and an optical device. The example optical device may be configured to receive incident optical information encoded with information data and control data. The incident optical information may be included in a first incident beam. The example optical device may also be configured to detect the control data in the incident optical information. The example optical device may additionally be configured to adjust the angle of reflection of the optical device in response to the detected control data, such that the reflection of the incident optical information may be directed to the target device. The reflection of the incident optical information may form a second incident beam for the target device.

According to some examples, the target device may be a computer device. In some examples, the computer device may be configured to detect the second incident beam and decode the information data. According to other examples, the example optical system may further include a first computer device and a second computer device. The first computer device may be configured for communication with the optical device and the second computer device may be configured to be the target device. In some examples, the information data of the incident optical information may include a first data portion and a second data portion. In different examples, the optical device may be further configured to reflect the second data portion in the first incident beam. In some examples, the second incident beam may include the second data portion. In some examples, the first computer device may decode the first data portion and the second computer device may decode the second data portion.

According to further examples, the example optical system may further comprise a second optical device and a third optical device. In some examples, the target device may be one of the second optical device and the third optical device.

According to some examples, the optical device may further include a mirror and a detection layer. In some examples, the information data may include information data encoded on a first wavelength. In some examples, a first control data of the control data may be encoded on a second wavelength. In other examples, the mirror may be reflective to the information data encoded on the first wavelength and may be transmissive to the first control data encoded on the second wavelength. In different examples, the detection layer may be operable to generate a first electrical signal on detection of light at the second wavelength transmitted through the mirror. In some examples, the first electrical signal may encode the detected control data.

According to further examples, the example optical system may further include a second optical device. The second optical device may include second control data, a second mirror, a second detection layer, and a second actuator element. In further examples, the second control data of the control data may be encoded on a third wavelength. In some embodiments, the first mirror may be further configured to reflect the second control data encoded on the third wavelength. In other examples, the second mirror may be reflective to the information data encoded on the first wavelength and may be transmissive to the second control data encoded on the third wavelength. In other examples, the second detection layer may be operable to generate a second electrical signal in response to detection of light at the third wavelength transmitted through the second mirror.

According to some examples, the example optical system may further comprise a computer device. In some examples, the reflection of the information data may be encoded on the first wavelength from the second optical device, which may be directed to the computer device. The computer device may be configured to detect a third incident beam. The computer device may also be configured to decode the information data on the first wavelength. The reflection of the information data encoded on the first wavelength by the second optical device may form a third incident beam.

According to different examples, the example optical system may further comprise a third optical device. The third optical device may include a third mirror, a third detection layer, and a third actuator element. In some examples, the control data may further include a third control data encoded on a fourth wavelength. In other examples, the mirror may further be configured to reflect the third control data encoded on the fourth wavelength. In different examples, the second mirror may be further configured to reflect the third control data encoded on the fourth wavelength. In other examples, the third mirror may be reflective to the information data on the first wavelength and may be transmissive to the third control data encoded on the fourth wavelength. In different examples, the third detection layer may be operable to generate a third electrical signal in response to detection of light at the fourth wavelength transmitted through the mirror.

According to further examples, the example optical system may further comprise a computer device and a fourth incident beam directed to the computer device. In some examples, the fourth incident beam may be formed by the reflection of the information data encoded on the first wavelength by the third optical device. The fourth incident beam may be directed to the computer device. In some examples, the computer device may be configured to detect the fourth incident beam and may be configured to decode the information data encoded on the first wavelength.

According to further examples, the first optical device, the second optical device, and the third optical device may be configured to route the information data encoded on the first wavelength. In some examples, the information data in the first incident beam of light may further comprise one or more of a wavelength and a band of wavelengths for communication of data. The control data in the first incident beam of light may include one or more of at least two wavelengths and at least two bands of wavelengths for communication of data for the control of the optical device and a second optical device.

According to further examples, the example optical system may further comprise a controller. The controller may be configured to receive the detected control data. The controller may also be configured to send a command to an actuator for adjusting the angle of reflection of the first optical device.

According to other examples, the example optical system may further comprise a source of light for the first incident beam of light. The source of light may include one or more of a wavelength and a band of wavelengths for information data. The source of light may also include one or more of at least two wavelengths and at least two bands of wavelengths for control data for the control of the optical device and the second optical device.

According to some examples, the example optical system may further comprise a controller. The controller may be configured to control outputs of the one or more of the wavelength and the band of wavelengths for information data and the one or more of the at least two wavelengths and the at least two band of wavelengths for the control data of the optical device and the second optical device.

According to some examples, the optical system may be adapted to route the first incident beam to the target device. In some examples, the optical system may further be adapted to route a second beam of light from the target device to a source of the first incident beam. In other examples, a surface of at least one of each mirror of the optical system may be one of a dichroic filter, a dielectric mirror, a beam splitter and a Bragg reflector.

According to further examples, the present disclosure describes an example method for controlling an optical switch. The example method may include arranging a first optical switch for communicating information data. The first optical switch for communicating information data may be arranged by reflecting at least a portion of an incident beam of light in a first wavelength range from a mirror. The first optical switch for communicating information data may also be arranged by transmitting through the mirror at least a portion of the incident beam of light having a second wavelength range. The first optical switch for communicating information data may also be arranged by controlling an orientation of the mirror of the optical switch using the transmitted portion of the incident beam of light, thereby altering an angle of reflection and a target destination of the reflected beam of light. The target destination may be a second optical switch.

According to other examples, the controlling of the orientation of the mirror of the optical switch using the transmitted portion of the incident beam of light may be accomplished by encoding the incident beam of light with first control data in the transmitted wavelength range, detecting the first control data, generating an electrical signal responsive to the first control data, and applying the electrical signal to an actuator for altering an angle of incidence of the mirror, thereby altering the angle of reflection and the target destination of the reflected beam.

According to further examples, the example method may additionally include arranging a mirror of the second optical switch for receiving the beam of light reflected from the first mirror. In some examples, the example method may include controlling an orientation of the mirror of the second optical switch using second control data encoded in the beam of light reflected from the first optical switch.

According to additional examples, the example method may additionally include encoding the second control data for the second mirror in one or more of a third wavelength and a band of wavelengths. The one or more of the third wavelength and the band of wavelengths may be configured to transmit through the mirror of the second optical switch.

According to some examples, applying the electrical signal to an actuator may comprise decoding the first control data in the detected electrical signal to generate electronic logic signals and may include applying the electronic logic signals to the actuator. In some examples, the example method may additionally include forming an arrangement of optical switches from one or more additional optical switches. In some examples, the example method may include controlling each of the one or more additional optical switches using a respective transmitted portion of a respective incident beam of light.

According to further examples, the example method may additionally include controlling the orientation of the array of optical switches for routing a beam of light with communication data through one or more optical switches in the array. In some examples, the example method may include controlling the orientation by an actuator selected from the group consisting of a microelectromechanical systems (MEMS) actuator, a piezoelectric actuator, and a comb-drive actuator. In some examples, the example method may also include utilizing the actuator to alter the output angle of the mirror by tilting the mirror on a single axis of rotation.

According to further examples, the example method may include including encoded control data in transmitted light. In other examples, the example method may include controlling the orientation by the actuator upon detection of the encoded control data.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes, systems, and/or other technologies described herein may be effected. For example, the vehicles by which the processes, the systems, and/or the other technologies may be effected include one or more of hardware, software, and/or firmware. The preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various examples of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, may be equivalently implemented in integrated circuits, as one or more computer programs running on one or more computers (for example, as one or more programs running on one or more computer systems), as one or more programs running on one or more processors (for example, as one or more programs running on one or more microprocessors), as firmware, or as virtually any combination thereof, and that designing the circuitry and/or writing the code for the software and/or firmware would be well within the skill of one of skill in the art in light of the disclosure.

The present disclosure is not to be limited in terms of the particular examples described in the application, which are intended as illustrations of various aspects. Many modifications and variations can be made without departing from its spirit and scope, as will be apparent to those skilled in the art. Functionally equivalent techniques and apparatuses within the scope of the disclosure, in addition to those enumerated herein, will be apparent to those skilled in the art from the foregoing descriptions. Such modifications and variations are intended to fall within the scope of the appended claims. The present disclosure is to be limited by the terms of the appended claims, along with the full scope of equivalents to which such claims are entitled. It is to be understood that the disclosure is not limited to particular techniques, reagents, compounds compositions or biological systems, which can, of course, vary. It is also to be understood that the terminology used herein is for the purpose of describing particular examples, and is not intended to be limiting.

In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (for example, a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (for example, feedback for sensing position and/or velocity of gantry systems; control motors for moving and/or adjusting components and/or quantities). A data processing system may be implemented utilizing any suitable commercially available components, such as those found in data computing/communication and/or network computing/communication systems.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the functionality is achieved. Hence, any two components herein combined to achieve a particular functionality may be seen as "associated with" each other such that the functionality is achieved, irrespective of architectures or intermediate components. Likewise, any two components so associated may also be viewed as being "operably connected", or "operably coupled", to each other to achieve the functionality, and any two components capable of being so associated may also be viewed as being "operably couplable", to each other to achieve the functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various compositions, techniques, systems, and devices are described in terms of "comprising" various components or processes (interpreted as meaning "including, but not limited to"), the compositions, techniques, systems, and devices can also "consist essentially of" or "consist of" the various components and processes, and such terminology should be interpreted as defining essentially closed-member groups.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. As such, for example, a group having 1-3 cells refers to groups having 1, 2, or 3 cells. Similarly, a group having 1-5 cells refers to groups having 1, 2, 3, 4, or 5 cells, and so forth.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. An optical device, the optical device comprising:
a mirror configured to:
receive a first incident beam encoded with information data encoded on a first wavelength, first control data encoded on a second wavelength at an angle of incidence, and second control data encoded on a third wavelength;
reflect the information data at the first wavelength;
transmit the control data at the second wavelength; and
reflect the second control data at the third wavelength;
a detection layer configured to:
receive the control data transmitted by the mirror; and
generate a first electrical signal in response to the control data; and
an actuator element coupled to the mirror and configured to:
alter the angle of incidence of the mirror in response to the first electrical signal.

2. The optical device of claim 1, wherein the mirror is further configured to:

adjust the angle of incidence to reflect the information data at the first wavelength; and adjust the angle of incidence to reflect the second control data at the third wavelength to a second optical device.

3. The optical device of claim 1, wherein the mirror comprises an optical element that includes one or more of: a dichroic filter, a dielectric mirror, a beam splitter, and a Bragg reflector.

4. An optical system comprising:
an optical device, wherein the optical device is configured to:
receive incident optical information encoded with information data and control data, wherein the incident optical information is included in a first incident beam;
detect the control data in the incident optical information;
adjust an angle of reflection of the optical device in response to the detected control data such that the reflection of the incident optical information is directed to a target device, wherein the reflection of the incident optical information forms a second incident beam for the target device; and
the target device, wherein the target device is configured to:
detect the second incident beam and decode the information data.

5. The optical system of claim 4, further comprising:
a first computer device and a second computer device, the first computer device configured for communication with the optical device and the second computer device configured to be the target device, wherein the information data of the incident optical information includes a first data portion and a second data portion;
wherein the optical device is further configured to reflect the second data portion in the first incident beam, the second incident beam including the second data portion; and
wherein the first computer device decodes the first data portion and the second computer device decodes the second data portion.

6. The optical system of claim 5, further comprising:
a source of light for the first incident beam, the source of light comprising a first wavelength and a band of wavelengths for information data and at least two wavelengths distinct from the first wavelength to carry control data for the control of the optical device and a second optical device.

7. The optical system of claim 4, wherein the optical device includes:
a mirror, wherein the mirror is reflective to the information data encoded on a first wavelength and transmissive to first control data encoded on a second wavelength; and
a detection layer operable to generate a first electrical signal on detection of light at the second wavelength transmitted through the mirror, wherein the first electrical signal encodes the detected control data.

8. The optical system of claim 7, further comprising a second optical device, wherein the second optical device includes:
the mirror further configured to reflect second control data encoded on a third wavelength;
a second mirror, wherein the second mirror is reflective to the information data encoded on the first wavelength and transmissive to the second control data encoded on the third wavelength;
a second detection layer, wherein the second detection layer is operable to generate a second electrical signal in response to detection of light at the third wavelength transmitted through the second mirror; and
a second actuator element.

9. The optical system of claim 8, further comprising:
a third optical device, the third optical device including:
the mirror is further configured to reflect the third control data encoded on a fourth wavelength;
the second mirror is further configured to reflect the third control data encoded on the fourth wavelength;
a third mirror, wherein the third mirror is reflective to the information data on the first wavelength and transmissive to the third control data encoded on the fourth wavelength;
a third detection layer, wherein the third detection layer is operable to generate a third electrical signal in response to detection of light at the fourth wavelength transmitted through the mirror; and
a third actuator element.

10. The optical system of claim 9, wherein a surface of at least one of each mirror of the optical system is selected from one or more of: a dichroic filter, a dielectric mirror, a beam splitter, and a Bragg reflector.

11. The optical system of claim 4, further comprising:
the information data in the first incident beam comprises one or more of a wavelength and a band of wavelengths for communication of data; and
the control data in the first incident beam comprises one or more of at least two wavelengths and at least two bands of wavelengths for communication of data for the control of the optical device and a second optical device.

12. The optical system of claim 4, further comprising:
a controller configured to:
receive the detected control data; and
send a command to an actuator to adjust the angle of reflection of the optical device.

13. A method to control an optical switch, the method comprising:
arranging a first optical switch to communicate information data by:
reflecting at least a portion of an incident beam of light in a first wavelength range from a mirror;
transmitting through the mirror at least a portion of the incident beam of light having a second wavelength range; and
controlling an orientation of the mirror of the optical switch that uses a transmitted portion of the incident beam of light, thereby altering an angle of reflection and a target destination of the reflected beam portion of the incident beam, the target destination being a second optical switch;
arranging the mirror of the second optical switch to receive the beam of light reflected from the mirror; and
controlling the orientation of the mirror of the second optical switch through use of second control data encoded in the beam of light reflected from the first optical switch.

14. The method of claim 13, wherein the controlling is accomplished by:
encoding the incident beam of light with first control data in a transmitted wavelength range;
detecting the first control data;
generating an electrical signal responsive to the first control data; and
applying the electrical signal to an actuator to alter an angle of incidence of the mirror, thereby altering the angle of reflection and the target destination of the reflected beam portion.

15. The method of claim 14, wherein applying the electrical signal to the actuator comprises:
  decoding the first control data in the electrical signal to generate electronic logic signals; and
  applying the electronic logic signals to the actuator.

16. The method of claim 13, further comprising:
  encoding the second control data for a second mirror in one or more of a third wavelength and a band of wavelengths, the one or more of the third wavelength and the band of wavelengths that transmit through the mirror of the second optical switch.

17. The method of claim 13, further comprising:
  forming an arrangement of optical switches from one or more additional optical switches; and
  controlling each of the one or more additional optical switches that the transmitted portion of the incident beam of light.

18. The method of claim 13, further comprising:
  controlling the orientation by an actuator selected from one or more of: a microelectromechanical systems (MEMS) actuator, a piezoelectric actuator, and a comb-drive actuator.

19. The method of claim 18, further comprising:
  utilizing the actuator to alter an output angle of the mirror by tilting the mirror on a single axis of rotation.

* * * * *